US008677025B2

(12) United States Patent
Gorodetsky et al.

(10) Patent No.: US 8,677,025 B2
(45) Date of Patent: Mar. 18, 2014

(54) LOW LATENCY COMMUNICATION VIA MEMORY WINDOWS

(75) Inventors: Igor Gorodetsky, Coquitlam (CA); Walter James Reinhard, Coquitlam (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/450,945

(22) Filed: Apr. 19, 2012

(65) Prior Publication Data

US 2012/0203928 A1    Aug. 9, 2012

Related U.S. Application Data

(63) Continuation of application No. 12/699,007, filed on Feb. 2, 2010, now Pat. No. 8,260,969, which is a continuation of application No. 10/950,515, filed on Sep. 28, 2004, now Pat. No. 7,685,319.

(51) Int. Cl.
*G06F 15/16* (2006.01)

(52) U.S. Cl.
USPC .......................................... 709/250; 709/212

(58) Field of Classification Search
USPC ................................................ 709/212, 250
See application file for complete search history.

(56) References Cited

U.S. PATENT DOCUMENTS

| 5,386,566 | A | 1/1995 | Hamanaka et al. |
| 5,519,851 | A | 5/1996 | Bender et al. |
| 5,687,342 | A | 11/1997 | Kass |
| 5,784,706 | A | 7/1998 | Oberlin et al. |
| 6,321,285 | B1 | 11/2001 | Sheafor et al. |
| 6,973,484 | B1 | 12/2005 | Singhal et al. |
| 7,181,541 | B1 | 2/2007 | Burton et al. |
| 2003/0081605 | A1 | 5/2003 | Egevang |
| 2005/0117578 | A1 | 6/2005 | Stewart et al. |
| 2005/0262269 | A1* | 11/2005 | Pike ................................ 710/1 |
| 2006/0095609 | A1 | 5/2006 | Radhakrishnan et al. |
| 2012/0222118 | A1* | 8/2012 | Sauve et al. ..................... 726/23 |

FOREIGN PATENT DOCUMENTS

| EP | 1396790 A2 | 3/2004 |
| GB | 2411088 A | 8/2005 |
| WO | 0036509 A2 | 6/2000 |
| WO | 2004091136 A2 | 10/2004 |

OTHER PUBLICATIONS

Blumrich et al. "Virtual Memory Mapped Network Interface for the SHRIMP Multicomputer". 1994.*
Blumrich et al. "Virtual-Memory-Mapped Network Interfaces". 1995.*
Blumrich et al., "Virtual Memory Mapped Network Interface for the SHRIMP Multicomputer", IEEE 1994, pp. 142-153.

* cited by examiner

*Primary Examiner* — Oscar Louie
*Assistant Examiner* — Bryan Lee
(74) *Attorney, Agent, or Firm* — Blakely, Sokoloff, Taylor & Zafman LLP

(57) ABSTRACT

A high performance computer system has compute nodes interconnected by an inter-node communication network. The compute nodes include local packetized interconnects. Shared memory between compute nodes is emulated by tunneling packetized interconnect packets between the compute nodes. A memory region on one of the compute nodes is used as a window into a memory region in another compute node. Special registers may be provided to expedite remote operations on small amounts of data.

17 Claims, 6 Drawing Sheets

LOW LATENCY COMMUNICATION VIA MEMORY WINDOWS

CROSS REFERENCE TO RELATED APPLICATIONS

This application is a continuation of U.S. application Ser. No. 12/699,007 filed on 2 Feb. 2010, which is a continuation of U.S. application Ser. No. 10/950,515 now U.S. Pat. No. 7,685,319 filed on 28 Sep. 2004 and entitled LOW LATENCY COMMUNICATION VIA MEMORY WINDOWS, the content of which is incorporated herein by reference.

TECHNICAL FIELD

This invention relates to data communication networks. In particular it relates to the internal communication network of multiprocessor computers. The invention describes a method for reducing the latency of such networks and sharing memory in a distributed memory computer system.

BACKGROUND

Multiprocessor, high performance computers (e.g. supercomputers) are often used to solve large complex problems. FIG. 1 shows schematically a multiprocessor computer 10 having compute nodes 12 connected by an inter-node communication network 14. Each node 12 has a network interface 16, which provides a data connection to inter-node communication network 14, at least one processor 18, and a memory 20. In FIG. 1, the network interface 16, processor 18 and memory 20 are shown explicitly for only two of the illustrated nodes. Processors 18 may conveniently comprise microprocessors. One example microprocessor which is currently available is the AMD Opteron™ microprocessor.

Software applications running on such computers split large problems up into smaller sub-problems. Each sub-problem is assigned to one of compute nodes 12. A program is executed on one or more processors of each compute node 12 to solve the sub-problem assigned to that compute node 12. The program run on each compute node 12 has one or more processes. Executing each process involves executing a sequence of software instructions. All of the processes execute concurrently and may communicate with each other.

Some problems cannot be split up into sub-problems which are independent of other sub-problems. In such cases, to solve at least some of the sub-problems, an application process must communicate with other application processes that are solving related sub-problems to exchange intermediate results. The application processes cooperate with each other to obtain a solution to the problem.

Communication between processes solving related sub-problems often requires the repeated exchange of data. Such data exchanges occur frequently in high performance computers. Communication performance in terms of bandwidth, and especially latency, are a concern. Overall application performance is, in many cases, strongly dependent on communication latency.

Communication latency has three major components:
the latency to transfer a data packet from a CPU or other device in a sending compute node to a communication network;
the latency to transfer a data packet across the communication network; and,
the latency to transfer a data packet from the communication network to a device such as a CPU in a receiving compute node.

In attempts to reduce latency, various topologies (e.g. hypercube, mesh, toroid, fat tree) have been proposed and/or used for interconnecting compute nodes in multi-node computer systems. These topologies may be selected to take advantage of communication patterns expected for certain types of high performance applications. These topologies often require that individual compute nodes be directly connected to multiple other compute nodes.

Low latency communication between processors in multiprocessor computers can be implemented using one of two paradigms: messaging and shared memory. Messages are used to communicate between nodes in distributed memory systems where each node has its own separate memory and a communication network connects the nodes together. For example, multiprocessor computer 10 in FIG. 1 is a distributed memory system.

If the nodes of a multiprocessor computer directly implement or emulate the sharing of memory, data can be communicated through the shared memory. One node can write into a shared data structure in the shared memory data to be read by one or more other nodes. Some computers directly implement shared memory in hardware. Hardware-based shared memory is very difficult to implement in computers having more than about 64 processors, because the performance of existing cache coherency technologies does not scale well.

Larger computers of hundreds and thousands of processors almost exclusively use distributed memory. Messaging is used to implement low latency communication between processors. In these systems, shared memory is sometimes emulated on top of messaging to provide an alternative for applications that were developed to use shared memory for communication.

One issue in emulating shared memory concerns the addressability of memory. High performance multiprocessor computer systems can incorporate large amounts of physical memory. For example, the inventors have designed a computer system which can incorporate 96 TB of physical memory. Memory density is anticipated to grow and costs will decrease. In the next few years, similar computer systems will probably incorporate in excess of 256 TB of physical memory. Directly addressing such large amounts of memory requires long addresses. For example, 48 bit addresses would be needed to directly address 256 TB of memory.

Unfortunately, some addressing systems which might be convenient to use within nodes of a computer 10 do not permit such long addresses. CPUs vary in their ability to support large address spaces. 32 bit CPUs only support 32 bit addressing. Some 64 bit CPUs (e.g. the AMD Opteron™) support 64 bit addressing inside the CPU, but only 40 bit addressing on the address bus external to the CPU. These CPUs are not capable of directly addressing 256 TB of physical memory.

Another issue is that of access rights to memory. In a 12,000 processor system, more than one application may be executing simultaneously. The ability of one application to access the memory assigned to another application must be carefully controlled. Applications must be prevented from accessing memory used by an operating system.

Another issue relates to control over communications used to emulate shared memory. Unless the system provides a global address space that spans all nodes, implementing shared memory may involve mapping memory from one node into the address space of another node. Since operating systems normally manage memory resources and the mapping of virtual addresses to physical addresses, it would be natural to make the operating system responsible for the communications that implements shared memory. This may have the undesirable side effect of making it practically necessary for the operating system to have a role in all communications, including supporting message-based communication. In this case, an application would have to make a system call to the operating system to send or receive a message.

Unfortunately, system calls significantly increase latency. A system call causes a software interrupt CPU instruction. When the software interrupt instruction is executed, the CPU is forced to execute an interrupt routine. To execute the interrupt routine, a typical CPU must switch to privileged execution mode. The memory management unit in the CPU must be flushed and reloaded with the virtual address to physical address mappings for operating system memory. The CPU caches will be invalidated and flushed, because operating system code is now executing. The interrupt routine must determine which system call was made. If the system call is simple, the interrupt routine may execute the necessary code and return the results directly. If not (message sending and receiving is typically not simple), the interrupt routine adds the system call parameters to an internal work queue to be processed at some later time when the kernel acquires extended use of the CPU.

All of this complexity leads to excessive latency. Current practice in high performance computing is to bypass the operating system for message sending and receiving. This exacerbates the previous access privileges issue, because now applications are directly accessing memory to send and receive messages. This potentially allows applications to interfere with the operating system messages that implement shared memory.

There is a need for multi-node computer systems which have mechanisms for providing low-latency messaging between nodes and which address some or all of the above-noted problems.

SUMMARY OF THE INVENTION

Various aspects of this invention provide methods performed in computer systems, computer systems and network interfaces for computer systems.

One aspect of the invention provides a method for exchanging data between compute nodes of a computer system. The computer system comprises a plurality of compute nodes interconnected by an inter-node communication network. Each of the compute nodes has an independent address space and comprises: a local packetized interconnect, a network interface coupled to the local packetized interconnect and the inter-node communication network, at least one data processor coupled to the local packetized interconnect; and, a memory system coupled to the local packetized interconnect. The method comprises tunneling data from the sending compute node to the receiving compute node by: placing a local packetized interconnect packet on the local packetized interconnect of the sending compute node; receiving the local packetized interconnect packet at the network interface of the sending compute node; encapsulating the local packetized interconnect packet in an inter-node communication network packet addressed to the receiving compute node; dispatching the inter-node communication network packet to the receiving compute node by way of the inter-node communication network; receiving the inter-node communication network packet at the network interface of the receiving compute node; extracting the local packetized interconnect packet from the inter-node communication network packet; placing the extracted packet onto the local packetized interconnect of the receiving compute node; and, between receiving the local packetized interconnect packet at the network interface of the sending compute node and placing the extracted packet onto the local packetized interconnect of the receiving compute node, performing an address translation on the local packetized interconnect packet, the address translation comprising writing to the local packetized interconnect packet a translated address based upon an offset value and upon a destination address for the local packetized interconnect packet.

Another aspect of the invention provides a method for exchanging data between compute nodes of a computer system having a plurality of compute nodes interconnected by an inter-node communication network. Each of the compute nodes has a distinct address space and a network interface interconnecting the inter-node communication network to a local packetized interconnect. The method comprises: associating a first range of addresses in the address space of a sending compute node with a receiving compute node; allocating a second range of addresses in the address space of the receiving compute node for sharing with the sending compute node, the second range of addresses being larger than the first range of addresses; at the network interface of the sending compute node, receiving a local packetized interconnect packet addressed to a first address in the first range of addresses, obtaining an offset value, encapsulating the local packetized interconnect packet in an inter-node communication network packet and forwarding the inter-node communication network packet to the receiving compute node; at the network interface of the receiving compute node, placing the local packetized interconnect packet onto the local packetized interconnect of the receiving compute node; and, after receiving the packet at the network interface of the sending compute node and before placing the local packetized interconnect packet onto the local packetized interconnect of the receiving compute node, translating an address of the local packetized interconnect packet from the first address to a second address in the second range of addresses, wherein the translating is based upon both the offset value and the first address.

Another aspect of the invention provides a method for exchanging data between compute nodes of a computer system having a plurality of compute nodes interconnected by an inter-node communication network. Each of the compute nodes has a distinct address space and a network interface interconnecting the inter-node communication network to a local packetized interconnect. Each of the compute nodes has control logic associated with the network interface. The control logic is independent of a processor of the node. The method comprises: providing a register accessible to the network interface of a sending one of the compute nodes, the register associated with a receiving one of the compute nodes; under the control of independent control logic in the network interface of the sending compute node detecting that the register has been modified; in response to modification of the register, under control of the control logic, automatically generating a local packetized interconnect packet addressed to an address specified by a value from the register in an address space of the receiving compute node corresponding to the register; encapsulating the local packetized interconnect packet in an inter-node communication network packet; and forwarding the inter-node communication network packet to the receiving compute node.

Another aspect of the invention provides a computer system comprising a plurality of compute nodes interconnected by an inter-node communication network. Each of the compute nodes has an independent address space and comprises:

a local packetized interconnect, a network interface coupled to the local packetized interconnect and the inter-node communication network, at least one data processor coupled to the local packetized interconnect; and, a memory system coupled to the local packetized interconnect. The network interface of each of a plurality of the compute nodes comprises an address translation facility configured to: receive a local packetized interconnect packet having an original address and to change the original address of the local packetized interconnect packet to a translated address based upon both the original address and an offset value.

Another aspect of the invention provides a computer system comprising a plurality of compute nodes interconnected by an inter-node communication network. Each of the compute nodes has an independent address space. Each of the compute nodes comprises a local packetized interconnect, a network interface coupled to the local packetized interconnect and the inter-node communication network, at least one data processor coupled to the local packetized interconnect; and, a memory system coupled to the local packetized interconnect. A sending one of the compute nodes comprises a register accessible to the network interface of the sending compute node. The register is associated with a receiving one of the compute nodes. The register may be associated with a memory region in the receiving one of the compute nodes. The network interface of the sending compute node comprises independent control logic configured to: detect modification of the register; in response to a detected modification of the register automatically generate a local packetized interconnect packet addressed to an address specified by a value from the register in an address space of the receiving compute node corresponding to the register; encapsulate the local packetized interconnect packet in an inter-node communication network packet; and, forward the inter-node communication network packet to the receiving compute node.

Another aspect of the invention provides a network interface for use in a compute node of a multiprocessor computer system. The network interface comprises a facility for maintaining associations between one or more ranges of addresses in an address space of the compute node and corresponding other compute nodes, and an address translation facility comprising a window control register corresponding to each of the address ranges. The network interface is configured to: receive packets on a local packetized interconnect each of the packets addressed to an original address in one of the one or more ranges of addresses; perform address translation on the packets by changing the original address of the local packetized interconnect packet to a translated address based upon both the original address and an offset value; and, encapsulate the packets in inter-node communication network packets addressed to the corresponding other compute nodes; and, dispatch the inter-node communication network packets by way of the inter-node communication network.

Further aspects of the invention and features of specific embodiments of the invention are described below.

BRIEF DESCRIPTION OF THE DRAWINGS

In drawings which illustrate non-limiting embodiments of the invention.

DESCRIPTION

Figure 1:
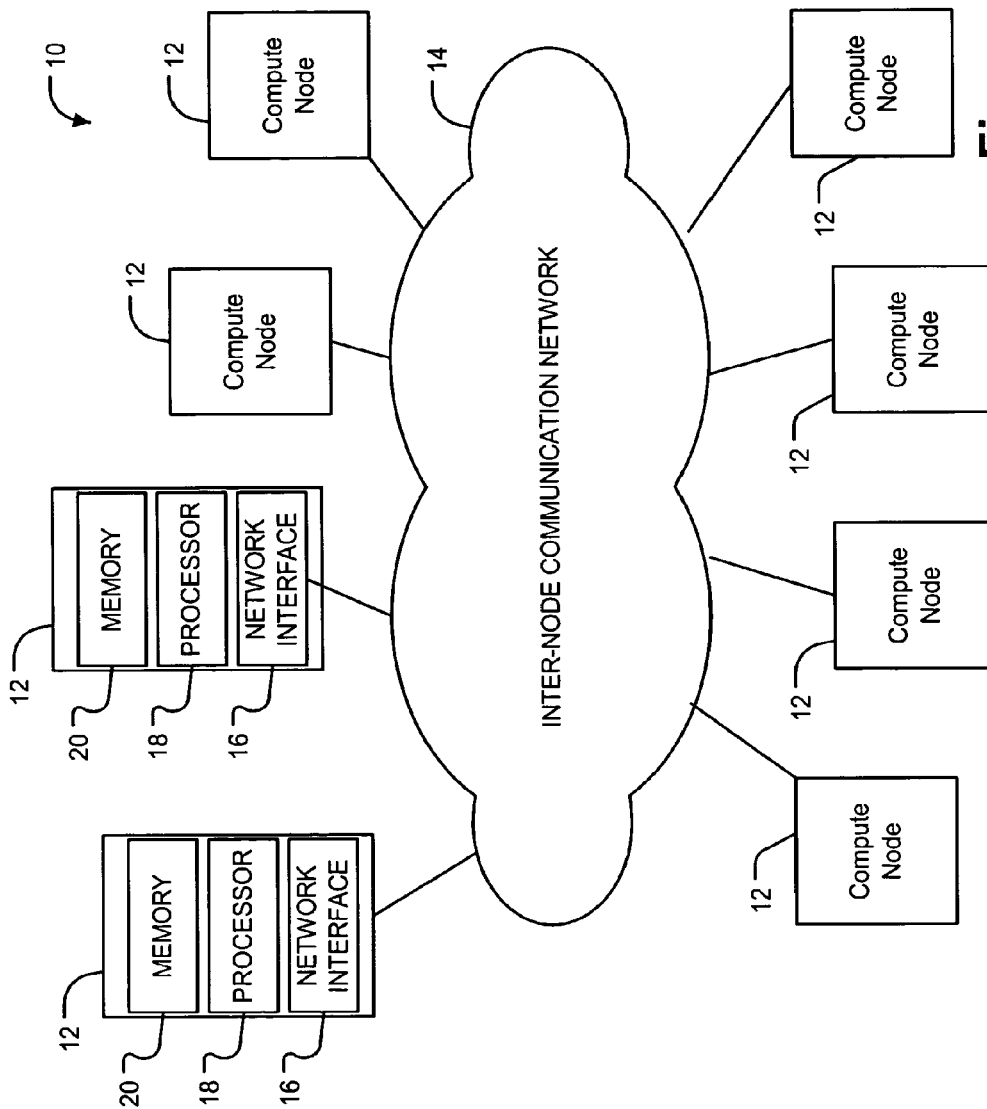
FIG. 1 illustrates the architecture of a prior art multiprocessor computer.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Embodiments of the invention described herein provide three benefits:

CPUs having a limited addressing range are given the ability to access large amounts of memory in other nodes in a distributed multiprocessor computer;

An application can restrict access to its memory;

It is not necessary to involve the operating system in message sending, message receiving, or memory sharing.

Embodiments of this invention may exploit the technology described in two commonly-owned U.S. patent applications. The co-pending commonly owned application Ser. No. 10/788,455 entitled DIRECTLY CONNECTED LOW LATENCY NETWORK AND INTERFACE, which is hereby incorporated herein by reference, describes methods and apparatus for implementing low latency communication between nodes in a computer system by directly interfacing a local packetized interconnect local to one node (e.g. Hyper-Transport™, RapidIO™, PCI Express™) with an inter-node communication network via a network interface. Both the local packetized interconnect and communication network use packetized protocols and full-duplex data links to simplify the implementation and reduce the latency of the network interface.

The co-pending commonly owned application Ser. No. 10/775,101 entitled SHARED MEMORY AND HIGH PERFORMANCE COMMUNICATION USING INTERCONNECT TUNNELING, which is hereby incorporated herein by reference, describes methods and apparatus which tunnel local packetized interconnect packets from a local packetized interconnect of one node to a local packetized interconnect of another node across the inter-node communication network. A region of a memory in the receiving node is mapped into a range in the address space of the sending node. The sending CPU writes to the mapped address range on its local packetized interconnect. Because the address range is associated with the network interface in the sending node, the local packetized interconnect packets are initially directed to the sending network interface. The sending network interface encapsulates the local packetized interconnect packets inside inter-node communication network packets. The encapsulated packets are sent over the inter-node communication network to a network interface in a receiving node. The receiving network interface extracts the local packetized interconnect packets and forwards them to the memory in the receiving node. The local packetized interconnect packets are modified in transit to translate their addresses (originally defined relative to an address space of the sending node) to the corresponding addresses in an address space of the receiving node.

Figure 2:
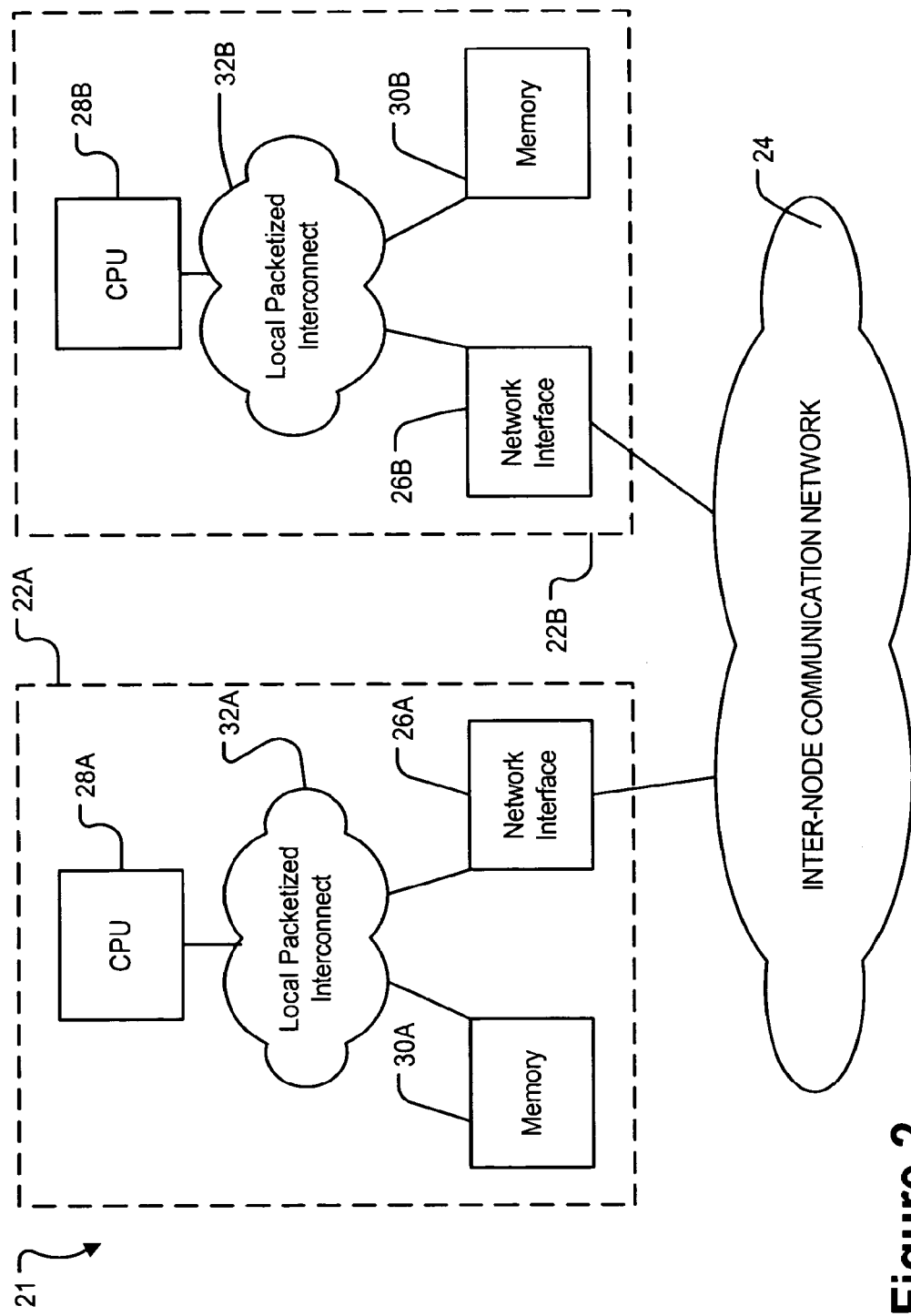
FIG. 2 illustrates the structure of compute nodes in a multiprocessor computer according to one embodiment of the invention.

Consider the two compute nodes 22A and 22B in the computer system 21 shown in FIG. 2. Computer system 21 would typically include many more than two nodes. In FIG. 2, nodes other than 22A and 22B are omitted for clarity. CPUs 28A and 28B are connected respectively to local packetized interconnects 32A and 32B. Each CPU and local packetized interconnect pair implements a separate address space. Locations in memories 30A and 30B are mapped into these respective address spaces.

It is not necessary for the data storage devices that store the data in memories 30 to be directly connected to a local packetized interconnect 32. Memories 30 may be memories of any suitable memory system. The memory systems may include suitable controllers that perform memory operations on memories 30 in response to requests conveyed to the controllers by way of the corresponding local packetized interconnect 32. Typically such memory systems permit memory operations to be performed without disrupting computation in the corresponding CPU 28.

Computer system 21 includes a mechanism which permits a range of addresses in the address space of node 22A to be mapped to memory 30B in node 22B. For example, computer system 21 may include a system as described in the co-pending commonly owned application Ser. No. 10/775,101 entitled SHARED MEMORY AND HIGH PERFORMANCE COMMUNICATION USING INTERCONNECT TUNNELING. Network interfaces 26A and 26B may interconnect inter-node communication network 24 and the respective local packetized interconnects 32A and 32B as described in application Ser. No. 10/788,455 entitled DIRECTLY CONNECTED LOW LATENCY NETWORK AND INTERFACE. Typically computer system 21 also includes a system which provides a mapping between a range of addresses in node 22B to memory locations in memory 30A of note 22A.

Figure 3:
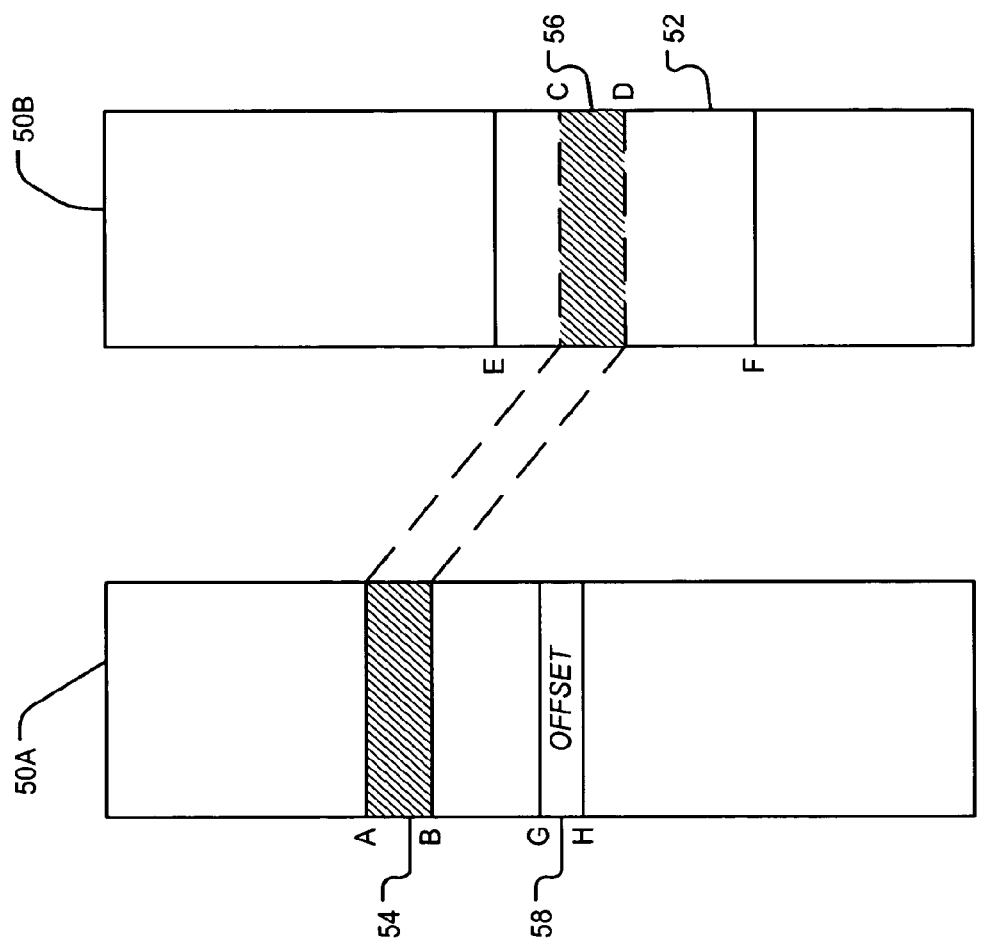
FIG. 3 illustrates a window of visibility from a sending CPU's address space into a region of memory in a receiving CPU's address space.

Referring now to FIG. 3, consider the physical address spaces 50A and 50B respectively of nodes 22A and 22B. Suppose that it is desirable to permit an application running at node 22A to write data into a portion of memory 30B that corresponds to a large region 52 in address space 50B. Region 52 extends between addresses E and F. To facilitate this, CPU 28A allocates a region 54 within its own address space 50A to be mapped to region 52. Region 54 extends between addresses A and B. Region 54 is typically significantly smaller than region 52. Region 54 is used as a window into the larger memory region 52.

At any time, address range 54 provides a window into a corresponding address range 56 of memory region 52. Address range 56 and address range 54 are equal in size. If address range 56 extends from offset C to offset D inclusive within memory region 52, the following equality will always be true:

$$WindowSize=B-A+1=D-C+1 \quad (1)$$

Here, Windowsize is the size of regions 54 and 56.

Processor 28A can cause data to be written to a memory location in memory 30B by generating one or more packets carrying the data on local packetized interconnect 32A. The packets are addressed to a destination address in range 54. In node 22A, addresses in range 54 cause the packets to be directed to network interface 26A. Network interface 26A has been configured to associate addresses in range 54 with node 22B. Network interface 26A therefore causes the local packetized interconnect packets to be tunneled to network interface 26B by:

encapsulating the local packetized interconnect packets in packets of inter-node communication network 24; and, sending the inter-node communication network packets to node 22B by way of inter-node communication network 24.

Network interface 26B strips the local packetized interconnect packets from the inter-node communication network packets. The local packetized interconnect packets can then be forwarded to memory 30B on local packetized interconnect 32B.

The destination addresses in the local packetized interconnect packets are translated at some point between the local packetized interconnect packets being received at network interface 26A and the local packetized interconnect packets being dispatched from network interface 26B to memory 30B on local packetized interconnect 32B. The address translation replaces each packet's original address in region 54 of address space 50A with a corresponding address in region 56 of address space 50B. It is most convenient to perform the address translation at sending network interface 26A.

In order to establish the appropriate address mapping, CPU 28B provides addresses E and F (or equivalent information such as address E or F and the size of memory region 52) to CPU 28A. CPU 28A, acting under control of suitable software, allocates address range 54 and configures network interface 26A with addresses A and E.

CPU 28A can access any portion of memory region 52 by causing the address translation to be altered, and thereby moving the location of window region 56 within region 52. In some embodiments, the location of window region 56 is controlled according to a value in a window control register 58 provided in network interface 26A. In the illustrated embodiment, a window control register 58 stores a desired offset value OFFSET. The window control register has an address in range 58 of address space 50A. CPU 28A writes the desired offset OFFSET into window control register 58. CPU 28A can access any part of memory 30B which has addresses in range 52 by writing an appropriate value for OFFSET into window control register 58 and writing to an address in range 54. The value of OFFSET determines the translation between address spaces 50A and 50B. It is convenient to define the translation such that the value of OFFSET is equal to C-E (the offset between the base address E of memory region 52 and the base address C of address range 56).

Network interface 26A translates an address 1 within address range 54 to the address m within memory region 52 according to the formula:

$$m=l-A+E+OFFSET \quad (2)$$

or an equivalent thereof. This assumes that the value of OFFSET is in the range of $0 \leq OFFSET \leq F+A-E-B$. Those skilled in the art will understand that the address translation may be performed in many ways. For example, a constant value could be added to or subtracted from the right hand side of relationship (2) and compensated for by using different values for OFFSET.

A mechanism should be provided to ensure that the value of OFFSET written into the window control register is such that address range 56 does not include any addresses which are not part of address range 52. This requires that the following relationships are always true:

$$0 \leq OFFSET \leq F-E-B+A \quad (3)$$

$$B-A=D-C \leq F-E \quad (4)$$

One mechanism for enforcing relationship (3) involves CPU 28A configuring network interface 26A with either address F or equivalent information, such as the size of memory region 52. Network interface 26A may use this information to ensure that relationship (3) is satisfied whenever an attempt is made to change the value of OFFSET in the window control register.

For example, the enforcement mechanism may be configured to check the value of OFFSET that an application running on CPU 28A is attempting to write to the window control register. If the check determines that the value of OFFSET would cause address range 56 to partially or completely fall outside of memory region 52, then network interface 26A may automatically, as appropriate:

modify the value to be the largest legal value allowed by relationship (3) (i.e. OFFSET=F−E−B+A);

modify the value to be the smallest legal value allowed by relationship (3) (i.e. OFFSET=0); or leave the existing value for the offset unchanged.

This ensures that address range 56 remains inside memory region 52 at all times.

To minimize latency, an application running on CPU 28A may be permitted direct access to write new values of OFFSET into window control register 58. The operating system on CPU 28A can prevent the application from writing an illegal value of OFFSET into register 58 by configuring an enforcement mechanism in network interface 26A with the necessary information (e.g. address F or the size of region 52) to check to ensure that OFFSET is always within a range of allowed values. Network interface 26A and the operating system may be designed so that only the operating system can supply this information. The enforcement mechanism may be configured at the time the original mapping between memory regions 54 and 52 is established.

It can be seen that CPU 28A can move address range 56 by changing the value of OFFSET to access much more memory than it can address directly. For example, consider a 12,000 node computing system. Each node could set aside 11,999 address ranges to act as windows into the memories of the other nodes in the system. Each of the address ranges may be fairly small (e.g. a few KB). A small amount of space would also be set aside for window control registers. If the address ranges are each 4 KB, for example, then each node would require only 47.996 MB of address space to be set aside for writing to memories in other nodes. It is practical to reserve this much address in a 32-bit address space. With such windows it is practical to provide embodiments of the invention in which each node can address terabytes of memory on other nodes.

Figure 6:
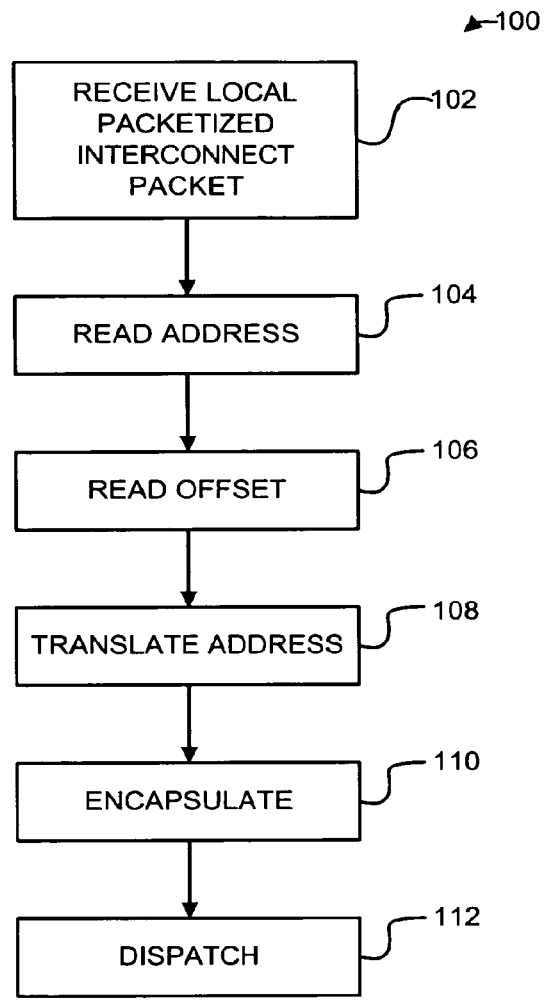

FIG. 6 illustrates a method 100 for transferring data between compute nodes of a computer system using a windowing approach. Method 100 may be performed at the network interface of a sending compute node. Method 100 begins at block 102 when the network interface receives a local packetized interconnect packet. In block 104 an original address of the packet is read. Based upon the original address, a value for OFFSET corresponding to the memory range to which the original address belongs is retrieved in block 106. Address translation is performed in block 108 based upon the retrieved value for OFFSET, the original address, and an address translation for addresses in the range to which the original address belongs. In block 110 the packet, with its translated address, is encapsulated in a packet capable of traversing the inter-node communication network. In block 112 the inter-node communication network packet is dispatched.

So far, only mapping between physical address spaces has been explained. Modern CPUs and operating systems do not expose physical address spaces to applications. Instead, each process of an application is given its own virtual address space to operate in. The operating system maintains a mapping between the virtual address space assigned to each process and the single physical address space.

Figure 4:
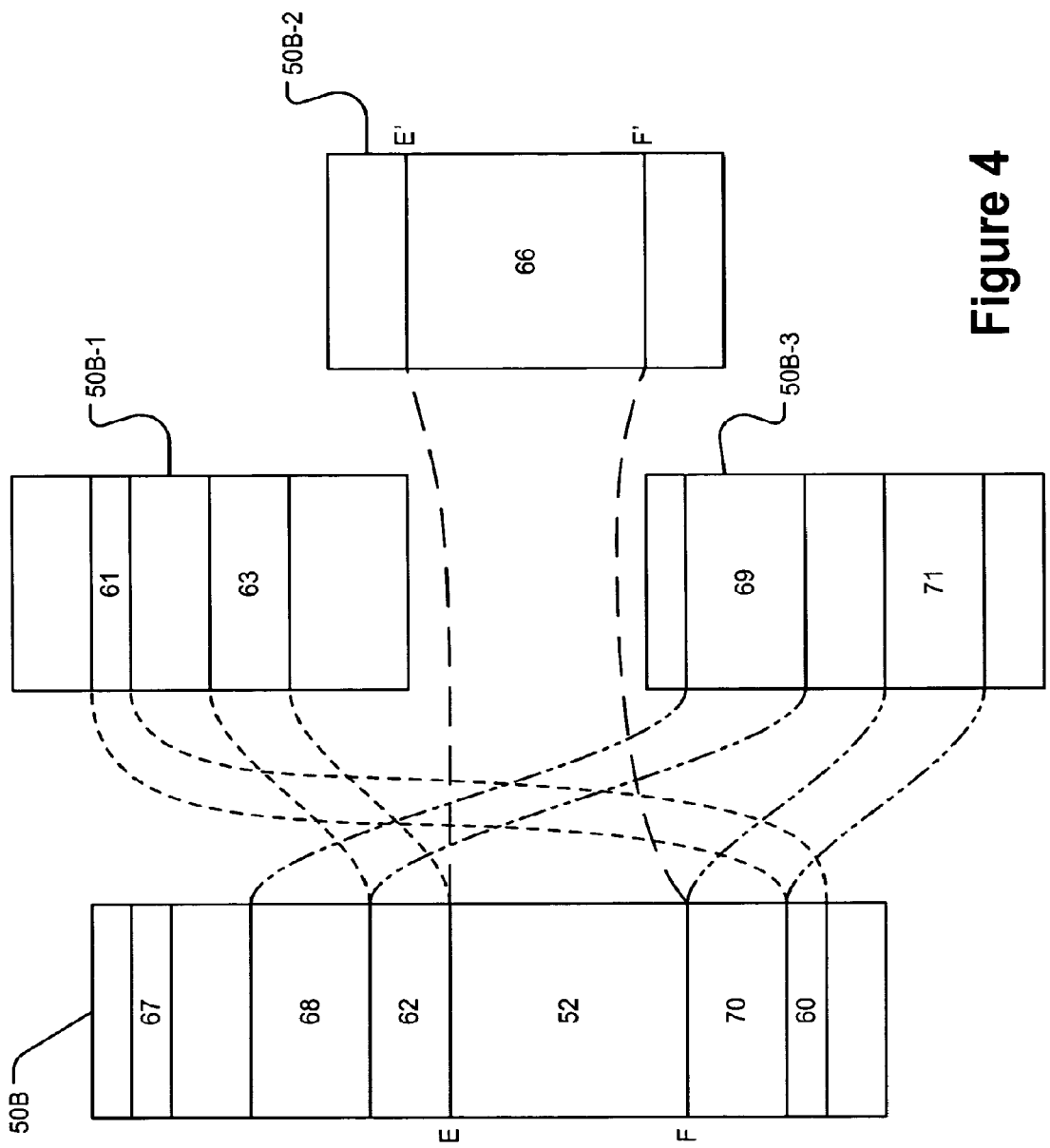
FIG. 4 shows how a region of memory in a receiving CPU's address space can be mapped into virtual memory of a receiving application.

FIG. 4 shows how three virtual address spaces 50B-1, 50B-2, and 50B-3 are mapped into physical address space 50B in compute node 22B. Physical address ranges 60 and 62 are mapped respectively into virtual address ranges 61 and 63 within virtual address space 50B-1. Memory region 52 within physical address space 50B is mapped into memory range 66 within virtual address space 50B-2. Similarly, physical address ranges 68 and 70 are mapped respectively into virtual address ranges 69 and 71 within virtual address space 50B-3.

Presumably, virtual address space 50B-2 corresponds to an application process running on CPU 28B that needs to communicate with an application running in CPU 28A. Memory range 66 is assigned to the virtual address range E' to F' inclusive.

The application to which virtual address space 50B-2 belongs does not know what part of the physical memory of address space 50B corresponds to virtual memory region 66. The application can cause CPU 28B to pass virtual addresses E' and F' to other nodes of computer system 21. This would not be helpful because CPU 28A needs addresses E and F to set up address translation in network interface 26A.

To further complicate matters, the operating system running on CPU 28B typically has the freedom to dynamically change the physical parts of memory 30B which correspond to virtual address space 66. For example, the operating system running on CPU 28B might swap information from all or a portion of physical memory region 52 out to disk and later substitute physical memory region 67.

Communication between nodes 22A and 22B using memory region 52 will only work properly if both CPUs 28A and 28B have an identical understanding of how physical memory region 52 maps into virtual memory region 66.

In some embodiments of the invention, applications running on CPU 28B work directly with physical memory regions. A mechanism is provided which permits an application to request the allocation of a virtual memory region that is statically pinned to a region of physical memory. By pinning the allocation, the operating system is prevented from substituting other parts of physical memory for region 52. The application is provided with the physical address range of region 52. The application can then communicate the physical address range to other nodes.

In some embodiments of the invention, node 22B has a facility accessible to network interface 26B for identifying the physical memory that corresponds to an address or range of addresses in a virtual address space such as address space 50B-2. This facility may include a GART (Graphics Address Resolution Table) subsystem (or equivalent). Some CPUs (e.g. AMD Opteron™) provide a GART subsystem which allows external devices to reference the virtual memory of processes. Some implementations of the GART subsystem allow the received local packetized interconnect packet to be directly sent to the virtual memory address. In such cases the GART subsystem directs the packet to the correct physical memory address.

When an application requests the allocation of a virtual memory region, it can exercise the option of having the virtual to physical address mapping made accessible by way of the GART. The application can then communicate virtual addresses to other nodes. When an encapsulated local packetized interconnect packet arrives at network interface 26B from node 22A, network interface 26B uses the address to which the local packetized interconnect packet is addressed (after address translation), possibly in conjunction with the fact that the packet was sent from node 22A to query the GART subsystem. The GART subsystem returns the physical address in address space 50B of node 22B. Network interface 26B writes the physical address into the local packetized interconnect packet and dispatches the packet on local packetized interconnect 32B.

Figure 5:
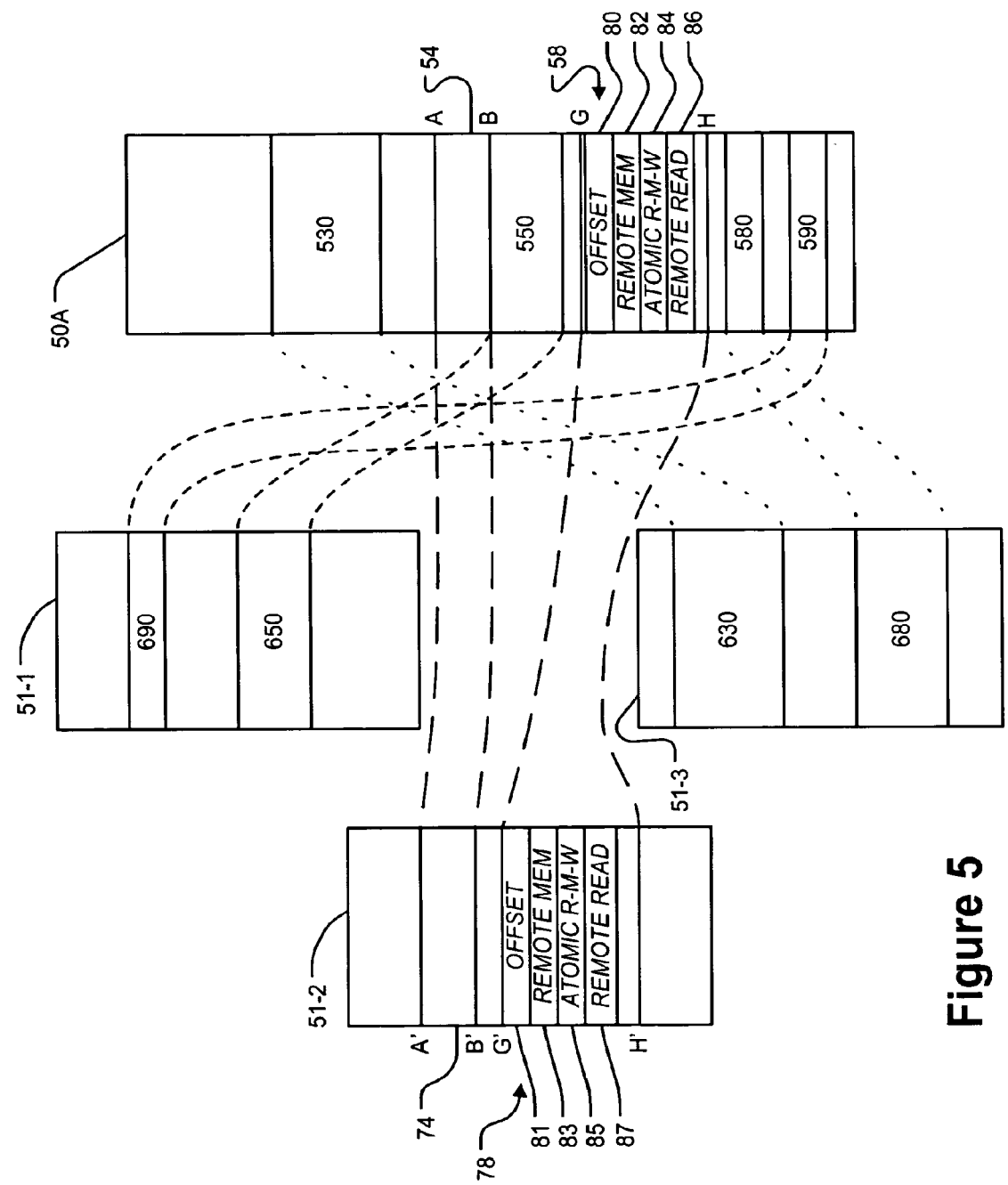
FIG. 5 shows how a window in an address space of a sending node can be mapped into an address space of a sending application; and, FIG. 6 is a flow chart illustrating a method for communicating data from a sending node to a receiving node in a computer system.

The establishment of mappings between virtual address spaces and physical address spaces at sending node 22A can be used to provide some memory access protection. FIG. 5 shows a possible mapping maintained by CPU 28A of physical address space 50A to virtual address spaces 51-1, 51-2, and 51-3. It can be seen that physical address ranges 54 and 58 are mapped respectively into virtual address ranges 74 and 78 in virtual address space 51-2.

As long as memory regions 54 and 58 are an exact multiple of the memory page size and aligned on memory page boundaries, and they are mapped into the virtual memory regions 74 and 78 of the applications that should have access to them, no other application can access these memory regions. The operating system will ensure that memory regions 54 and 58 are only mapped into the virtual memory of the appropriate application. Since applications can not directly access physical memory in typical systems, these memory regions will not be accessed by other applications running on CPU 28A.

Even with the protection afforded by memory mapping, as described above, an incorrect address mapping in network interface 26A would allow CPU 28A to access arbitrary physical memory pages in compute node 22B. This can be prevented through the use of protection tags.

In embodiments of the invention which use protection tags, network interface 26A includes a protection tag with tunneled local packetized interconnect packets directed to network interface 26B. Network interface 26B verifies that the protection tag is valid for the location to which the local packetized interconnect packet will be directed. If the protection tag is valid, the memory access proceeds. If the protection tag is invalid, the memory access is disallowed.

A protection tag may be associated with memory region 66 when it is allocated. The protection tag can be created automatically in the process of allocating region 66. In the alternative, a protection tag may be generated and provided by an application which requires that the memory allocated to it be protected from interference by other applications. In either case, network interface 26B registers the protection tag (i.e. maintains an association between the protection tag, the virtual memory region 66 to which the protection tag corresponds and the corresponding region 52 to which memory region 66 corresponds from time to time).

The application running on CPU 28B is given the protection tag. When it establishes communication with an application running on CPU 28A, the protection tag is passed to the application on CPU 28A and saved in network interface 26A when the address mapping between physical memory regions 54 and 52 is established.

Thereafter, when network interface 26A receives a local packetized interconnect packet addressed to memory region 54 it encapsulates the packet in an inter-node communication network packet together with a copy of the protection tag and forwards it to network interface 26B on inter-node communication network 24. When address translation is performed at network interface 26A, network interface 26A also changes the destination address of the local packetized interconnect packet.

When network interface 26B receives the tunneled packet it determines that the packet would modify the content of physical memory region 52. Network interface 26B then verifies that the packet is accompanied by a protection tag which matches the protection tag which has been previously registered in relation to memory region 52. Network interface 26B may also perform a translation between a virtual address in range 66 and a corresponding address in physical address region 52 by appropriately changing the destination address of the tunneled local packetized interconnect packet before dispatching the local packetized interconnect packet onto local packetized interconnect 32B.

Embodiments of the invention which use protection tags include a clean-up mechanism to deregister a protection tag when the address range that it protects is deallocated. This prevents an application on a remote node from continuing to write to a memory region after the memory region has been deallocated and subsequently allocated to another application.

A protection tag may comprise any bit pattern that is uniquely associated with the memory region being protected. The protection tag should be sufficiently large that it is unlikely to be accidentally duplicated in a trusted environment. In an untrusted environment the protection tags should be sufficiently large that it is impractical to reproduce the protection tags in a reasonable amount of time by brute force trial and error.

To provide appropriate security and management of resources, it is appropriate to involve the operating system in memory region allocation, the establishment of communication, the establishment of address mappings in network interface 26A, the establishment of protection tag verification in network interface 26B, and the establishment of virtual to physical address space mappings. Once this has been done however, ongoing communication can be handled by the applications without the need for operating system involvement.

An application running in CPU 28A can set the value of OFFSET in window control register 80 by writing to address 81 in its own virtual address range 78, and then writing data to a suitable memory address in its virtual address range 74. This will automatically result in the generation of local packetized interconnect packets that are tunneled via network interfaces 26A and 26B to memory region 66.

The use of address ranges 74 and 78 in node 22A to communicate with memory region 66 in node 22B works well when an application running on CPU 26A performs many memory accesses in address range 74 between accesses to address range 78 to move the window within memory region 66. For a sequence of accesses to widely spaced locations within memory region 66, this mechanism is not as efficient as it could be. Under worst-case conditions, two memory references (one to address range 78 followed by one to address range 74) could be required to effect each memory access to memory region 66.

Efficiency can be improved for highly random memory accesses that involve small data items. Consider address range 78. This address range already contains the window control register into which the value of OFFSET is written. Since this address range must typically be at least one memory page in size (typically a size such as 4 KB), room is available to implement additional registers. Some embodiments of the invention provide one or more special registers for memory accesses in other nodes which require the transfer of relatively small amounts of data.

Some such embodiments provide a remote memory access register 82 having two fields: one for an address and one for a data item that is to be written. As shown in FIG. 5, an application may write to remote memory access register 82 by writing to a location 83 in range 78 of its virtual address space 51-2. Remote memory access register 82 is associated with node 22B. It is advantageous that remote memory access register 82 can be manipulated with a single memory access. Where network interface 26A implements remote memory access register 82, network interface 26A can detect attempts to write to remote memory access register 82 and, in response, generate tunneled local packetized interconnect packet to access the corresponding memory location(s) in memory region 66 at node 22B.

Remote memory access register 82 may have an address in a block of addresses (e.g. a memory page) that is allocated by an operating system exclusively to a specific application that should be permitted to access memory register 82. This prevents other applications from being able to write to memory register 82. For additional protection, a suitable memory protection tag system may be implemented. Where a memory protection tag system is implemented, network interface 26B of receiving node 22B may block local packetized interconnect packets which attempt to access memory location(s) in memory region 66 unless the local packetized interconnect packet is accompanied by a memory protection tag corresponding to memory region 66. Various memory protection tag schemes which may be used, or adapted in obvious ways, for use in conjunction with embodiments of this invention are known to those skilled in the field of computer system architecture.

Some embodiments use atomic read-modify-write operations to modify the contents of memory region 66 at node 22B from node 22A. Atomic read-modify-write operations are typically used to implement synchronization primitives that allow CPUs 28A and 28B to coordinate their use of memory region 66. Tunneling local packetized interconnect atomic read-modify-write packets may be troublesome, because the local packetized interconnect 32A of compute node 22A may utilize timeouts that are too short to support the round trip to compute node 22B. Furthermore, it may be undesirable to suspend activity on local packetized interconnect 32A until the atomic read-modify-write operation has completed.

This problem may be addressed by providing a special atomic read-modify-write register 84. Atomic read-modify-write register 84 can be accessed at an address 85 in address range 78 of virtual address space 51-2. Atomic read-modify-write register 84 contains an address field that designates a location within memory region 66 and may contain one or more of:

- a field into which a value is written that will be compared with the current value in the designated location in memory region 66;
- a field into which a value is written that will replace the current value in the designated location in memory region 66 if the comparison succeeds;
- a field into which the current value of the designated location in memory region 66 is returned;
- a flag that is set when an atomic read-modify-write operation completes; and,
- a flag indicating whether the atomic read-modify-write operation succeeded.

Various types of atomic read-modify-write operations are possible. For example, some computer systems provide "compare and swap" or "fetch and increment" operations. Some embodiments of the invention there support more than one type of atomic read-modify-write operation. This can be facilitated by including in atomic read-modify-write register 84 a field containing a value specifying the type of atomic read-modify-write operation to be performed. In the alternative, a computer system may provide separate atomic read-modify-write registers for each of the supported types of atomic read-modify-write operation.

In some embodiments an atomic read-modify-write operation is triggered by making a local write into atomic read-modify-write register 84. The local write may specify a location, comparison value, and replacement value. In response to the local write, network interface 26A generates and tunnels to node 22B an atomic read-modify-write local packetized interconnect packet. Network interface 26B receives the tunneled atomic read-modify-write packet and forwards it to memory region 52 (i.e. virtual memory region 66 of the application at node 22B which is sharing data with node 22A).

In response to receiving the atomic read-modify-write packet, memory system 30B generates a local packetized interconnect response packet. The response packet contains a success indication and current value of the memory location or a failure indication. The response packet is received by way of local packetized interconnect 32B at network interface 26B, which tunnels the response packet through inter-node communication network 24 to network interface 26A. Upon receiving the response packet, network interface 26A modifies atomic read-modify-write register 84 by updating the current value field, completion flag, and success flag.

An application running on CPU 28A can determine that the atomic read-modify-write operation has been completed by polling atomic read-modify-write register 84 using read operations. When such a read operation determines that the completion flag is set, the application knows that the operation has completed. The application can then determine whether the success flag has been set. If so, the application knows that the atomic read-modify-write operation has succeeded and that the current value field of atomic read-modify-write register 84 contains the value stored at the location in memory region 66 to which the atomic read-modify-write operation was directed prior to execution of the atomic read-modify-write operation. If the application determines that the completion flag has been set but the success flag is not set then the application knows that the atomic read-modify-write operation failed.

CPU 28A can use a similar method to read memory region 66. A normal read operation may be troublesome to forward due to timeouts being too short to allow the round trip to compute node 22B. A special remote read register 86 may be provided to facilitate reads from memory in node 22B. Read register 86 may include:

- an address field designating a location within memory region 66 to be read;
- a field into which the current value of the designated location in memory region 66 is returned; and,
- a completion flag that is set when the read operation completes and the current value is represented in remote read register 86.

As shown in FIG. 5, remote read register 86 may be accessed at a memory location 87 in region 78 of virtual address space 51-2.

An application running on CPU 28A can use remote read register 86 to read data from node 22B by causing CPU 28A to write a location into read register 86. This causes network interface 26A to generate a read request packet and to tunnel the local packetized interconnect read request packet to node 22B. At node 22B, interface 26B dispatches the read request packet to memory 30B on local packetized interconnect 32B. Memory 30B returns a read response packet containing the current value of the desired memory location. Upon receiving the read response packet, network interface 26B tunnels the read response packet back to node 22A. At node 22A, network interface 26A receives the tunneled read response local packetized interconnect packet and, in response, writes the current value of the desired memory location to the appropriate field in remote read register 86 and sets a completion flag in remote read register 86.

The application running on CPU 28A can poll remote read register 86 until it detects that the completion flag has been set. Once the completion flag is set, the current value field can be read.

It is unnecessary for the operating system of either CPU 28A or 28B to be involved on an ongoing basis with every communication between nodes 22A and 22B. In the embodiments described above, network interfaces 26A and 26B can translate addresses and verify protection tags without involving the operating system of processors 28A or 28B as long as these functions are implemented by control logic that operates independently of processors 28A or 28B rather than in operating system drivers. Network interfaces 26A and 26B may comprise embedded controllers, data processors, hardware logic circuits, configured field-programmable gate arrays (FPGAS), and/or other suitable local control mechanisms which facilitate operation as described herein.

The foregoing description has described the operation of various embodiments of the invention with reference to the example of a one-way relationship between compute nodes 22A and 22B. Of course, compute nodes 22A and 22B may also have the reciprocal relationship that provides CPU 28B with a window into a memory region in compute node 22A. In typical embodiments of the invention, each compute node of a computer system has windows into memory regions of multiple other compute nodes. Some or all compute nodes may have multiple windows into multiple memory regions or multiple windows into a single memory region of another compute node. In general, it can be useful to allow any compute node in a computer system to concurrently establish windows into the memory of any other compute nodes in the system.

Those skilled in the art will appreciate that many variations of the above embodiments are possible while remaining within the spirit of the invention. Examples include:

Instead of node 22B passing addresses E and F to node 22A it could pass a memory region ID and size. In such embodiments, address translation is most conveniently performed at network interface 26B. Network interface 26B would need to receive the values of address A and OFFSET to perform such address translation. In such embodiments, the value of OFFSET stored at network interface 26B is dynamically updated as it changes. Ideally, in such embodiments, network interface 26A is configured to automatically communicate any new value for OFFSET to network interface 26B in response to the value for OFFSET being changed. The communication could comprise a message sent from network interface 26A to network interface 26B by way of inter-node communication network 24. For example, the value of OFFSET may be carried in inter-node communication network packets that carry encapsulated local packetized interconnect packets to network interface 26B. Network interface 26A may automatically send the value of OFFSET to network interface 26B. An advantage of performing address translation at receiving node 22B is that node 22B can replace physical memory region 52 with a different physical memory region without having to inform sending node 22A.

The above description refers to addresses C and D as being the boundaries of window 56 into memory region 52. C and D may be represented as offsets within memory region 52 or equivalently as addresses within address space 50B. Where C and D are represented as addresses, the corresponding offsets from address E can be readily calculated, if needed, by subtracting address E from addresses C and D.

Additional special registers could be provided to facilitate other types of synchronization primitive (e.g. test-and-set, test-and-increment, test-and-add, etc.). In some embodiments, local packetized interconnects 32A and 32B operate under protocols that support a plurality of primitive operations and a specialized register is provided for implementing a plurality (in some cases all) of the supported primitive operations at a remote node. Network interfaces 26A and/or 26B could emulate other primitives which are not directly supported by the protocol of local packetized interconnects 32A and 32B. For example, if the local packetized interconnects directly support compare-and-swap and test-and-add operations, it would be possible for network interface 26B to emulate a test-and-multiply synchronization primitive by entering into a three step loop of reading the current value, performing the multiply operation, and then performing a compare-and-swap synchronization primitive. This loop may be repeated until the compare-and-swap succeeds.

For certain synchronization primitives (e.g. test-and-set), it is not necessary that network interfaces 26A and 26B support the ability to report failure to an application running on CPU 28A. Network interface 26B can repeatedly perform the atomic read-modify-write operation on memory region 66 until the operation succeeds.

The sizes of window 56 and memory region 52 could be the same in some instances.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method for exchanging data between compute nodes of a computer system having a plurality of compute nodes interconnected by an inter-node communication network, each of the compute nodes having a distinct address space and a network interface interconnecting the inter-node communication network to a local packetized interconnect, the method comprising:

providing a register accessible to the network interface of a sending one of the compute nodes, the register associated with a receiving one of the compute nodes;

under the control of independent control logic in the network interface of the sending compute node:

detecting that the register has been modified;

in response to modification of the register automatically generating a local packetized interconnect packet addressed to an address specified by a value from the register in an address space of the receiving compute node corresponding to the register, wherein the address is calculated by adding a base address of the address space of the receiving compute node to an offset value stored in a window control register of the network interface and a local address in an address space of the sending compute node and subtracting a base address from the address space of the sending node subtracted from the local address;

encapsulating the local packetized interconnect packet, including the address, in an inter-node communication network packet; and forwarding the inter-node communication network packet to the receiving compute node by way of the inter-node communication network.

2. A method according to claim 1 comprising providing a plurality of registers at the sending compute node, each of the plurality of registers associated with a different receiving compute node, the method further comprising:

in response to modification of a first register of the plurality of registers automatically generating a first local packetized interconnect packet addressed to a first address specified by a value from the first register in an address space of a first receiving compute node corresponding to the first register;

encapsulating the first local packetized interconnect packet, including the first address, in a first inter-node communication network packet; and forwarding the first inter-node communication network packet to the first receiving compute node by way of the inter-node communication network;

in response to modification of a second register of the plurality of registers automatically generating a second local packetized interconnect packet addressed to a second address specified by a value from the second register in an address space of a second receiving compute node corresponding to the second register;

encapsulating the second local packetized interconnect packet including the second address in a second inter-node communication network packet; and forwarding the second inter-node communication network packet to the second receiving compute node by way of the inter-node communication network.

3. A method according to claim 1 wherein the register comprises a remote memory access register comprising a data field and the method comprises including data from the data field in the local packetized interconnect packet.

4. A method according to claim 3 comprising, at the receiving compute node performing a memory access operation in response to the local packetized interconnect packet.

5. A method according to claim 4 wherein the memory access operation comprises a memory write operation, wherein the data from the data field is written to a memory of the receiving compute node at a location corresponding to the address.

6. A method according to claim 5 comprising forwarding a write confirmation message from the receiving compute node to the sending compute node upon completion of the memory write operation.

7. A method according to claim 1 wherein the register comprises a remote read register and generating the local packetized interconnect packet comprises generating a local packetized interconnect read request packet.

8. A method according to claim 7 comprising, at the receiving compute node, performing a memory read operation in response to the local packetized interconnect read request packet.

9. A method according to claim 8 comprising forwarding one or more local packetized read response packets generated at the receiving compute node in response to the memory read operation to the sending compute node.

10. A computer system comprising a plurality of compute nodes interconnected by an inter-node communication network, each of the compute nodes having an independent address space and comprising:
a local packetized interconnect,
a network interface coupled to the local packetized interconnect and the inter-node communication network,
at least one data processor coupled to the local packetized interconnect; and,
a memory system coupled to the local packetized interconnect;

wherein a sending one of the compute nodes comprises a register accessible to the network interface of the sending compute node, the register being associated with a receiving one of the compute nodes; and wherein, the network interface of the sending compute node comprises independent control logic configured to:
detect modification of the register;
in response to a detected modification of the register automatically generate a local packetized interconnect packet addressed to an address specified by a value from the register in an address space of the receiving compute node corresponding to the register, wherein the address is calculated by adding a base address of the address space of the receiving compute node to an offset value stored in a window control register of the network interface and a local address in an address space of the sending compute node and subtracting a base address from the address space of the sending node subtracted from the local address;
encapsulate the local packetized interconnect packet in an inter-node communication network packet; and,
forward the inter-node communication network packet to the receiving compute node corresponding to the register by way of the inter-node communication network.

11. A computer system according to claim 10 wherein the sending compute node comprises a plurality of registers each associated with a different one of a corresponding plurality of receiving ones of the compute nodes.

12. A computer system according to claim 11 wherein each of the compute nodes constitutes a sending one of the compute nodes and each of the compute nodes comprises:

a plurality of registers each one of the plurality of registers associated with a different one of a corresponding plurality of receiving ones of the compute nodes; and wherein, the network interface of each of the compute nodes comprises independent control logic configured to:
detect modifications of the registers;
in response to a detected modification of one of the registers, automatically generate a local packetized interconnect packet addressed to an address specified by a value from the register in an address space of the receiving compute node corresponding to the register for which the modification was detected;
encapsulate the local packetized interconnect packet in an inter-node communication network packet; and,
forward the inter-node communication network packet to the receiving compute node corresponding to the register for which the modification was detected by way of the inter-node communication network.

13. A computer system according to claim 10 wherein the register comprises a remote memory access register comprising a data field and the network interface is configured to include data from the data field in the local packetized interconnect packet.

14. A computer system according to claim 10 wherein the register comprises a remote read register and the network interface of the sending compute node is configured to generate a local packetized interconnect read request packet in response to the detected modification of the register.

15. A computer system according to claim 10 wherein the register is one of a plurality of registers and the sending compute node comprises a register set comprising a plurality of the registers, each of the plurality of registers in the register set associated with a corresponding one of a plurality of memory operations and the network interface of the sending compute node is configured to, in response to detecting modification of one of the registers of the register set, automatically generate a local packetized interconnect packet that includes a request for performance of the memory operation associated with the modified one of the registers, in the receiving compute node corresponding to the modified one of the registers.

16. A computer system according to claim 15 wherein the sending compute node comprises a plurality of the register sets, each of the register sets associated with a different one of a corresponding plurality of receiving ones of the compute nodes.

17. A computer system according to claim 15 wherein the sending node comprises a plurality of the register sets, each of the register sets associated with a different region of memory in the receiving compute node.

\* \* \* \* \*